May 6, 1924.
H. E. BRUNNER
1,492,672
ANTIFRICTION BEARING AND METHOD OF ASSEMBLING THE SAME
Filed April 14, 1921
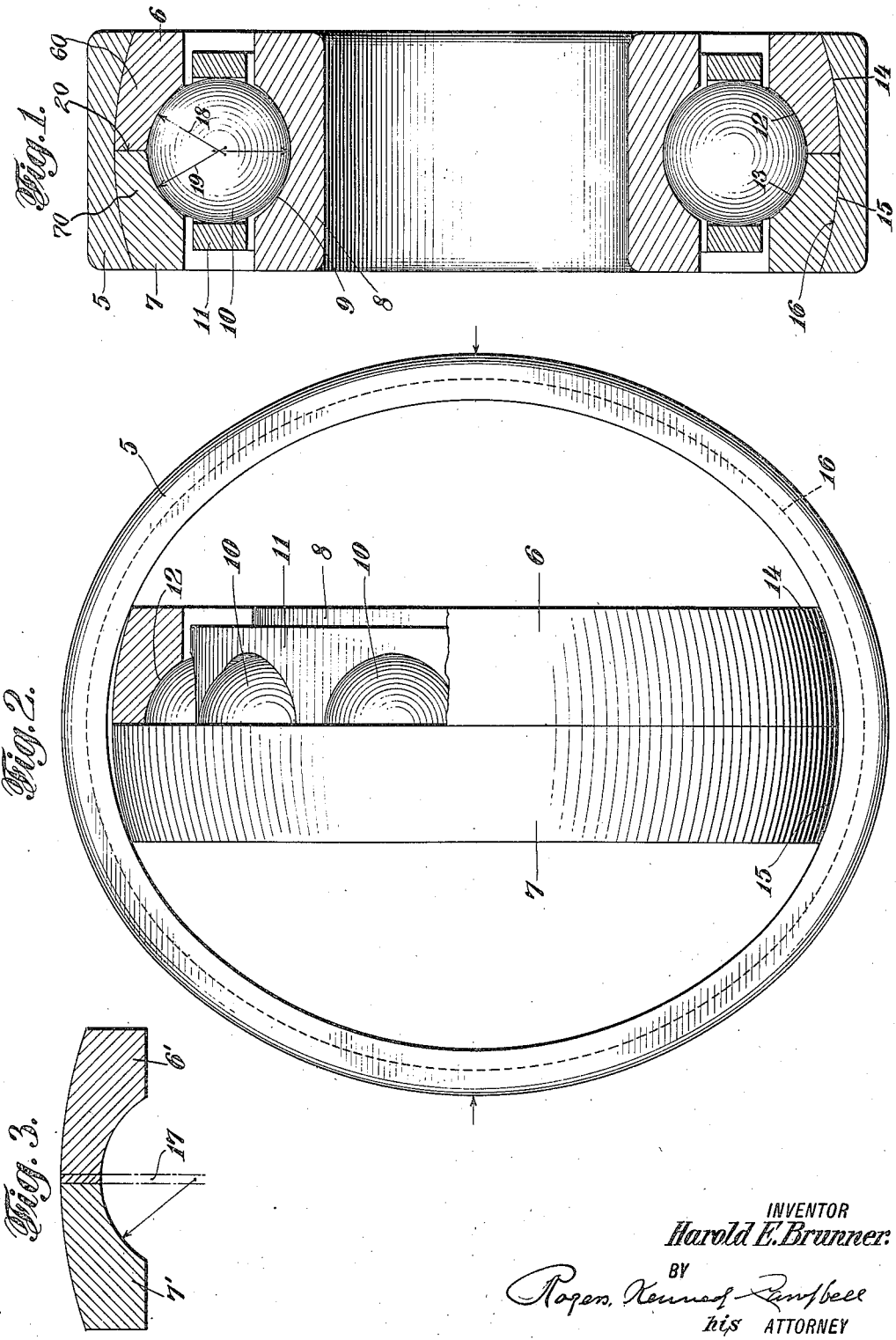
INVENTOR
Harold E. Brunner:
BY
Rogers, Kennedy Campbell
his ATTORNEY Patented May 6, 1924.

1,492,672

UNITED STATES PATENT OFFICE.

HAROLD E. BRUNNER, OF LARCHMONT, NEW YORK, ASSIGNOR TO THE HESS-BRIGHT MANUFACTURING COMPANY, OF PHILADELPHIA, PENNSYLVANIA, A CORPORATION OF DELAWARE.

ANTIFRICTION BEARING AND METHOD OF ASSEMBLING THE SAME.

Application filed April 14, 1921. Serial No. 461,332.

*To all whom it may concern:*

Be it known that I, HAROLD E. BRUNNER, a citizen of the United States, residing at Larchmont, in the county of Westchester and State of New York, have invented certain new and useful Improvements in Antifriction Bearings and Method of Assembling the Same, of which the following is a specification, reference being had therein to the accompanying drawing.

This invention relates to a composite or built-up race ring for ball or roller bearings, and has for an object to provide an improved structure wherein the rolling elements are run upon track surfaces having continuous, uninterrupted side walls, and wherein a large number of balls or other rolling elements, up to a full set or row, may be employed. Other objects and important features of the invention appear below in the descriptive portion of this specification, some of its novel features not being specifically catalogued in this introductory portion.

The drawings accompanying this specification are illustrative of my improved bearing and the method employed to assemble the same.

Figure 1 shows in central longitudinal section a practicable embodiment of a form of my invention applied to ball bearings.

Fig. 2 is a side view of the outer portion of the outer ring shown in Fig. 1, and an elevation of the inner portion of the outer ring partly broken away revealing the balls etc. and shown at about right angles to such outer portion, illustrating one step in the method of assembling or building up the entire bearing, and Fig. 3 is an enlarged view illustrating a step in the grinding or forming operation, particularly with respect to the race groove in the composite ring.

The outer race ring illustrated in the drawing is a unitary structure and is practically integral, in that the parts are permanently held together in their assembled relation. The outer portion 5 is under tension, and the inner portion, comprises a pair of members 6 and 7, under compression, the static stress uniting the whole together into a condition of rigidity or integrality. The condition of rigidity just mentioned, of course, does not mean that the built up ring structure is inflexible as a ring, it being elastic to a certain degree. The parts are preferably so proportioned that the internal stress acts more strongly upon the outer portion than upon the inner portion.

The inner ring 8 of the bearing is shown as of the uninterrupted deep-groove type. In the race groove 9 of this ring there is shown mounted a row or series of balls 10, greater in number than may be inserted by eccentric displacement, the balls being spaced by a cage 11.

The race groove of the outer ring is preferably so formed in cross section that the radius of the respective sides 12 and 13 are struck from centers located upon opposite sides of the median line of the bearing, whereby the ball does not engage the two members 6 and 7 at the joint or meeting line between them. The ball travels upon paths at the respective sides of the median plane of the bearing, whereby, when the bearing is under pure radial load, the center of the ball is disposed in such plane and the ball has a three point contact, one point with the inner ring and two points with the outer ring.

The inner surface or perimeter 16 of the outer portion 5 of the outer ring is shown spherical and having its center at a point located on the axis of rotation of the bearing midway between the two sides thereof, and the outer surfaces or perimeters 14 and 15 of the two members 6 and 7 are likewise formed upon a sphere having the same center.

A convenient method of forming the race groove in the members 6 and 7 is to clamp together blanks 6' 7', (see Fig. 3) with a distance piece 17 between them, such distance piece being of a thickness equal to the predetermined distance apart of the centers of the curves of the race grooves 12 and 13 in the members 6 and 7 when completed. By this means it is practicable to form a groove, considered in a cross sectional direction, upon the continuous arc of a circle. The advantage of this is that the groove may be formed by the oscillatory method, or if it is desired to resort to form grinding, the dressing of the wheel to a single curve of a single radius is much simpler than the dressing of the respective sides of the wheel to curves having centers spaced apart by but a small distance. After the grooves have been formed and polished, the separating piece 17 is removed and the abutting edges of the members 6′ 7′ placed together, whereupon the outer surface 14—15 of these members is ground to the segment of a true sphere.

The bearing is assembled substantially as follows: The balls 10 are assembled in the groove 9 of the inner ring 8 together with the retainer 11. The pair of inner members 6 and 7 are then placed in position upon the respective sides of the balls, the juxtaposed side faces 60, 70, abutting at the median plane 20 of the bearing. The parts thus assembled are presented to the outer portion 5 of the outer ring in substantially the position illustrated in Figure 2, the portion 5 having previously been raised to a temperature considerably above the temperature of the inner portion. When the parts are formed of steel the permissible temperature difference is not sufficient to permit the entrance of the members 6 and 7 into position within the portion 5. This latter, however, is compressed upon the sides and temporarily sprung out of round for the purpose of elongating one diameter to permit the insertion of the inner portion. After the inner portion has been moved into a central position within the outer portion, this latter is permitted to assume its normal form and the inner portion is rotated into the Figure 1 position, whereupon the outer portion, upon acquiring the same temperature as the other parts of the bearing, shrinks into such dimensions that it securely locks the abutting side faces of the members 6 and 7 one against the other, and holds them from relative movement in respect of each other, and in respect of the outer portion, the parts then being found to be practically rigid or integral.

By the mode above described for assembling the bearing, it is obvious that any desired number of balls up to a full series may be inserted between rings having deep race grooves provided with uninterrupted side walls.

The radius lines 18 and 19 ending in arrows, Figure 1, indicate not only the radius of the curves of the race grooves but also the points of contact between the ball and the members 6 and 7 during certain conditions of load. The term "point of contact", while having a well defined meaning in the ball bearing industry and being based on the geometrical theory that a sphere touches such a surface as the ball race at a point only, is subject to the correction that the deformation of the ball and race ring extend these points into areas of greater or less extent. If the radius of curvature of these grooves very nearly approximates the radius of the ball, it is quite apparent that when under no load, or a small load, the angle between the points of contact will be much greater than when the bearing is under more load or considerable load, the points of contact being in the first instance toward the edge of the groove and in the latter, and during the continuance of pressure, which deforms the parts at the point of contact moving toward the bottom of the groove. When the bearing is constructed with certain relation of ball radius to groove radius, there will be widely separated points of contact when the bearing is under certain load, and practically complete contact throughout the entire cross sectional area of the groove when the bearing is under other and more excessive loads. These conditions may be varied at will so that during ordinary running conditions under the load the bearing is designed to carry, the center of the area of contact is well down into the groove, but at a considerable distance from the bottom thereof; and when the bearing is subjected to excessive or shock loads which are incident to the particular installation for which the bearing is designed, the ball engages the bottom of the groove and practically throughout the entire area.

The points of contact between the ball and its races varies with the amount of thrust load to which the bearing is subjected, this variation being of course modified by the amount of radial load carried at the same time. By the proper relative proportioning of the radial and thrust loads, the balls may be caused to engage one of the members 6 or 7, and be practically free of the other. Under such conditions it will engage the race of the inner ring upon the opposite side of the median line of the bearing. In such conditions the structure becomes a two point contact bearing, and the load is supported substantially after the manner of deep groove combined radial and thrust bearings.

There is no tendency for the members 6 and 7 to separate one from another, or for either to move laterally, either incident to radial load or thrust load, which movement would produce a wedging action. The meeting surface between the inner and outer portions of the outer ring is spherical, and the larger component of the lines of force when the bearing is under load is perpendicular to such meeting surface. This is not true whether the load be radial or thrust, or the resultant of a combination of these.

I claim as my invention:

1. In a ball bearing, the combination with an inner ring formed with a race groove and provided with a series of balls, of a composite outer ring built up of an inner portion comprising a pair of members formed upon their inner perimeters with a race groove, their outer perimeters being spherical, and an outer portion having a mating spherical surface, said outer portion being shrunk onto said inner portion.

2. A bearing as set forth in claim 1, wherein the parts are so formed and organized that the larger component of the lines of force passing through the balls and from one portion to the other of the outer ring are perpendicular to the sphere defining the spherical meeting surface between the inner portion and the outer portion thereof.

3. In a ball bearing, the combination with an inner ring formed with a deep race groove and provided with a series of balls, of a composite outer ring built up of an inner portion comprising a pair of members formed upon their inner perimeters with a race groove, their outer perimeters being spherical, and an outer portion having a mating spherical surface, said outer portion being shrunk onto said inner portion and holding the same in compression.

4. A bearing as set forth in claim 3, wherein the juxtaposed side faces of the members comprising the inner portion of the outer ring closely abut on a plane coincident with the plane containing the line inscribed at the bottom of the race groove in the outer ring.

5. In an anti-friction bearing, the combination with an inner ring and rolling elements tracking thereon, of a composite ring built up of an inner portion comprising a pair of members formed upon their inner perimeters with race tracks for the rolling elements, their outer perimeters being spherical, and an outer portion having a mating spherical surface, said outer portion being shrunk onto said inner portion.

6. A bearing as set forth in claim 5 wherein the parts are so formed and organized that the lines of force, passing through the rolling elements and from one portion to the other of the outer ring, have their larger component perpendicular to the spherical meeting surface between the said portions.

7. In an anti-friction bearing, the comnation with an inner ring and rolling elements tracking thereon, of a composite ring built up of an inner portion comprising a pair of members formed upon their inner perimeters with race tracks for the rolling elements, their outer perimeters being spherical, and an outer portion having a mating spherical surface, said outer portion being shrunk onto said inner portion and holding the same in compression.

8. A race ring for an anti-friction bearing embodying an inner portion comprising a pair of members formed upon their inner perimeter with a race groove, their outer perimeter being spherical, and an outer portion having a mating spherical surface, said outer portion being shrunk onto said inner portion and holding the same in compression.

9. The method of assembling an anti-friction bearing which consists in placing the rolling elements upon the inner ring of the bearing, assembling a pair of members constituting the inner portion of an outer ring upon the respective sides of the rolling elements, the outer surface of said members being spherical, then heating an outer portion of the said ring provided with a mating spherical surface, then springing the said outer portion out of round for elongating one diameter, then placing the said heat expanded and deformed portion about the assembled inner portion in a transverse position, then permitting the outer portion to assume its normal form, then turning the inner portion into position within the outer portion and then bringing the entire structure to substantially uniform temperature whereby the outer portion is under tension and the inner portion under compression, the whole outer ring being tensed together into a condition of rigidity and integrality.

10. The method of assembling a ball bearing which consists in placing the balls upon the inner ring of the bearing, assembling a pair of members constituting the inner portion of an outer ring upon the sides of the balls, the outer surface of said members being spherical, then heating an outer portion of the said ring provided with a mating spherical surface, then springing the said outer portion out of round for elongating one diameter, then placing the said heat expanded and deformed portion about the assembled inner portion in a transverse position, then permitting the outer portion to assume its normal form, then turning the inner portion into position within the outer portion and then bringing the entire structure to substantially uniform temperature whereby the outer portion is under tension and the inner portion under compression, the whole outer ring being tensed together into a condition of rigidity and integrality.

In testimony whereof, I have affixed my signature hereto.

HAROLD E. BRUNNER.